(12) United States Patent
Biris et al.

(10) Patent No.: US 11,728,741 B2
(45) Date of Patent: Aug. 15, 2023

(54) METHOD OF OPERATING A POWER GENERATION SYSTEM

(71) Applicant: VESTAS WIND SYSTEMS A/S, Aarhus N (DK)

(72) Inventors: Ciprian Biris, Hinnerup (DK); Kent Tange, Ry (DK); Duy Duc Doan, Tilst (DK); Gert Karmisholt Andersen, Hovedgård (DK); Torsten Lund, Fredericia (DK); Lars Meyer, Nørager (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 64 days.

(21) Appl. No.: 17/278,161

(22) PCT Filed: Sep. 19, 2019

(86) PCT No.: PCT/DK2019/050274
§ 371 (c)(1),
(2) Date: Mar. 19, 2021

(87) PCT Pub. No.: WO2020/057707
PCT Pub. Date: Mar. 26, 2020

(65) Prior Publication Data
US 2021/0351714 A1    Nov. 11, 2021

(30) Foreign Application Priority Data
Sep. 19, 2018   (DK) .......................... PA 2018 70608

(51) Int. Cl.
*H02M 5/42*     (2006.01)
*H02P 9/02*     (2006.01)
(Continued)

(52) U.S. Cl.
CPC ................ *H02M 5/42* (2013.01); *F03D 9/25* (2016.05); *H02M 1/44* (2013.01); *H02P 9/02* (2013.01); *F05B 2220/706* (2013.01)

(58) Field of Classification Search
CPC ...... H02M 5/42; H02M 1/44; H02M 7/53876; H02M 1/0025; H02M 5/4585; F03D 9/25; (Continued)

(56) References Cited

U.S. PATENT DOCUMENTS

| 6,201,720 B1    | 3/2001 | Tracy et al. |
| 2004/0046456 A1 | 3/2004 | Tracy et al. |

(Continued)

FOREIGN PATENT DOCUMENTS

| EP | 3264593 A1     | 1/2018 |
| WO | 2012083963 A1  | 6/2012 |

(Continued)

OTHER PUBLICATIONS

PCT Notification of Transmittal of the International Search Report and the Written Opinion of the International Searching Authority, or the Declaration for Application No. PCT/DK2019/050274 dated Jun. 3, 2020.

(Continued)

*Primary Examiner* — Joseph Ortega
(74) *Attorney, Agent, or Firm* — Patterson + Sheridan, LLP

(57) ABSTRACT

This invention concerns a method of controlling a power converter system 26 operating in an overmodulation region. The power converter system 26 comprises more than two current controllers 71, 73, 77, 79 a modulator 76 and a power converter 78, and the modulator 76 is configured to provide at least one modulated drive signal 87 to the power converter 78 based on voltage reference vector signals 82*a*, 82*b*, 82*c*, 82*d* from the more than two current controllers 71, 73, 77, (Continued)

79. The method comprises determining the voltage reference vector signals 82a, 82b, 82c, 82d; determining compensated voltage reference vector signals 84a, 84b, 84c, 84d indicative of a fundamental frequency of a respective voltage reference vector signal 82a, 82b, 82c, 82d; and, determining the at least one modulated drive signal 87 based on a combination of the compensated voltage reference vector signals 84a, 84b, 84c, 84d.

16 Claims, 7 Drawing Sheets

(51) Int. Cl.
*H02M 1/44* (2007.01)
*F03D 9/25* (2016.01)

(58) Field of Classification Search
CPC .... F03D 7/0272; H02P 9/02; F05B 2220/706; Y02E 10/72; Y02E 10/76; Y02T 30/00
See application file for complete search history.

(56) References Cited

U.S. PATENT DOCUMENTS

| 2012/0056602 | A1* | 3/2012 | Li | H02P 9/48 |
| | | | | 322/89 |
| 2014/0008912 | A1* | 1/2014 | Gupta | H02J 3/50 |
| | | | | 290/44 |
| 2017/0272014 | A1 | 9/2017 | Ren et al. | |

FOREIGN PATENT DOCUMENTS

| WO | 2012159989 A2 | 11/2012 |
| WO | 2020057707 A2 | 3/2020 |

OTHER PUBLICATIONS

Danish Patent and Trademark Office 1st Technical Examination for Application No. PA 2018 70608 dated Mar. 18, 2019.
European Patent Office, Communication Pursuant to Article 94(3) EPC for Application 19 853 262.4-1202 dated Jun. 27, 2022.

\* cited by examiner

METHOD OF OPERATING A POWER GENERATION SYSTEM

FIELD OF THE INVENTION

This invention generally relates to the field of power generation systems for wind turbines. In particular, the invention relates to a method of controlling a power converter system of the power generation system.

BACKGROUND

The output voltage of an inverter can be maximised when the inverter is operated in an overmodulation region. However, this can lead to a loss of control as current converters used in the inverter become saturated. One way of compensating for this loss of control is to linearize a modulator of the inverter, ensuring that the input modulation index to the modulator and the output modulation index from the inverter are substantially equal, but this is not suitable for closed loop feedback control systems.

It is against this background that the invention has been devised.

STATEMENTS OF INVENTION

According to a first aspect of the invention, there is provided a method of controlling a power converter system operating in an overmodulation region, the power converter system comprising more than two current controllers, a modulator and a power converter, wherein the modulator is configured to provide at least one modulated drive signal to the power converter based on voltage reference vector signals from the more than two current controllers, the method comprising: determining the voltage reference vector signals; determining compensated voltage reference vector signals indicative of a fundamental frequency of a respective voltage reference vector signal; and, determining the at least one modulated drive signal based on a combination of the compensated voltage reference vector signals.

Preferably, the method further comprises, for each one of the voltage vector signals, applying a filter for each of the voltage reference vector signals to provide a modified voltage reference vector signal; applying a first set of adjustment gains to the modified voltage reference vector signals; applying a second set of adjustment gain to the voltage reference vector signals; and, combining the gain adjusted modified voltage reference vector signals and the gain adjusted voltage reference vector signals to provide the compensated voltage reference vector signals.

Preferably, the first set of adjustment gains is a reducing set of adjustment gains and the second set of adjustment gains is an amplifying set of adjustment gains.

Preferably, the method further comprises, for each one of the compensated voltage reference vector signals, applying a third set of adjustment gains to the compensated voltage reference vector signals; and, determining the modulated drive signal based on a combination of the gain adjusted compensated voltage reference vector signals.

Preferably, the voltage reference vector signals are determined based on current reference errors.

Preferably, the current reference errors are determined based on the difference between a respective current reference vector signal and a measured current reference from the power converter.

Preferably, the current reference vector signals each relate to one of a positive or negative sequence in a d-q two-axis rotational reference frame (QPos, QNeg, DPos, DNeg).

Preferably, the filters are low-pass filters comprising a variable bandwidth. More preferably, the variable bandwidth of the low-pass filters is based on a set of modulation indexes.

Preferably, the method further comprises determining a set of gains as a predetermined function of a set of modulation indexes; and, determining the set of adjustment gains based on the set of gains.

Preferably, the modulation indexes are determined based on a DC link voltage signal and respective voltage reference vector signals.

Preferably, the modulation indexes are moving-average modulation indexes.

Preferably, the more than two current controllers comprise four current controllers.

According to a second aspect of the invention, there is provided a plurality of current controllers for a power converter system comprising a processor and a memory module, wherein the memory module comprises a set of program code instructions which when executed by the processor implement a method according to the first aspect of the invention.

According to a third aspect of the invention, there is provided a power generation system comprising the current controllers according to the second aspect of the invention.

BRIEF DESCRIPTION OF DRAWINGS

The above and other aspects of the invention will now be described, by way of example only, with reference to the accompanying drawings, in which.

Figure 1:
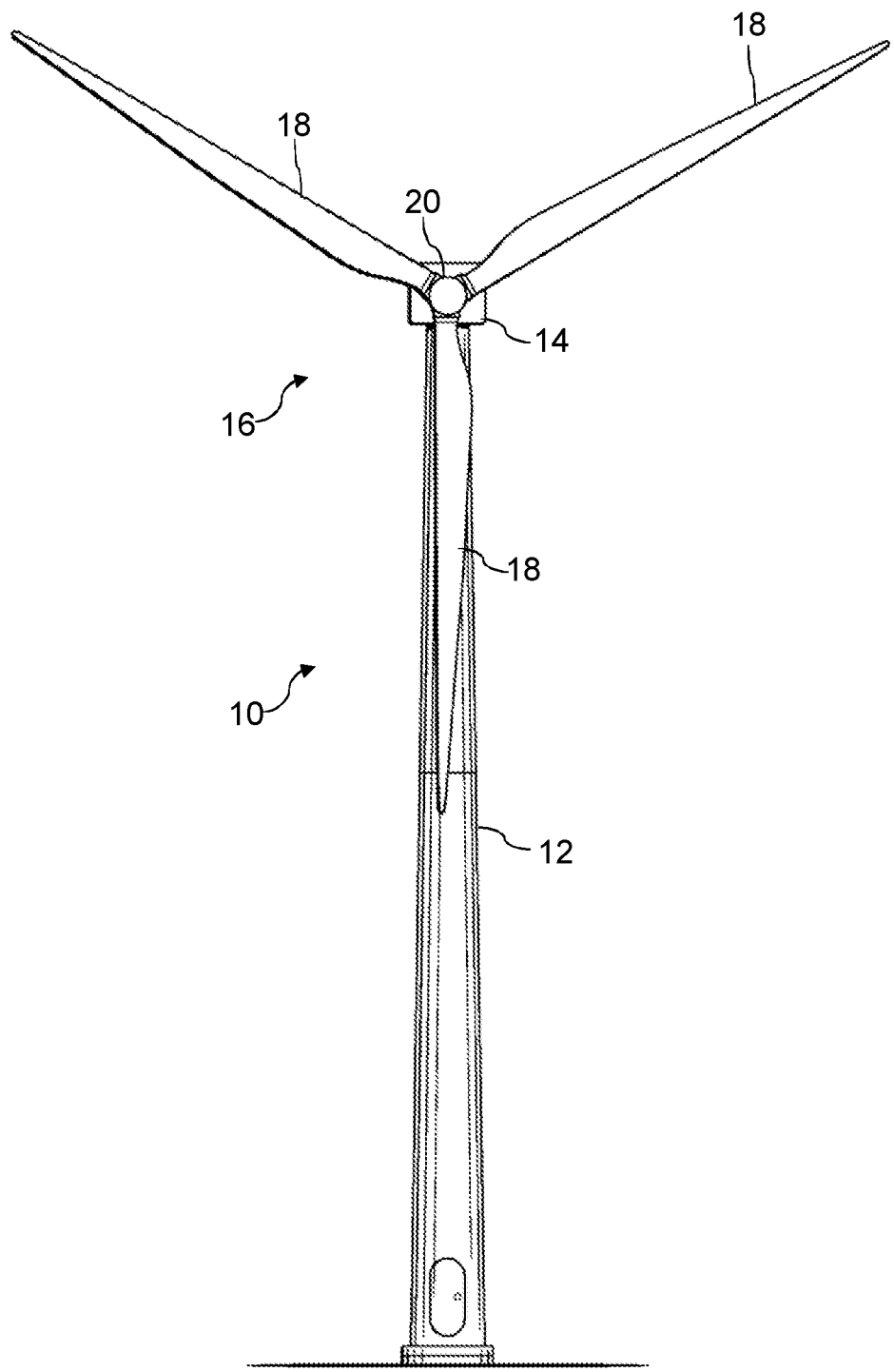
FIG. 1 is a schematic view of a wind turbine suitable for use with the invention.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised, and structural, logical and electrical changes may be made without departing from the scope of the invention as defined in the appended claims.

To provide context for the invention, FIG. 1 shows a wind turbine, generally designated as 10, of the kind that may be used with embodiments of the invention. In this example, the wind turbine 10 is a three-bladed upwind horizontal-axis wind turbine, which is the most common type of wind turbine in use. The wind turbine 10 comprises a tower 12 supporting a nacelle 14, to which a rotor 16 is mounted. The rotor 16 comprises a plurality of rotor blades 18 extending radially from a central hub 20. In this example, the rotor 16 comprises three rotor blades 18, although it will be apparent to the skilled reader that other configurations are possible. The rotor 16 is operatively coupled to a generator housed inside the nacelle 14. The generator is arranged to be driven by the rotor 16 to produce electrical power. Thus, the wind turbine 10 is able to generate electrical power from a flow of wind passing through a swept area of the rotor 16, causing it to rotate. In addition to the generator, the nacelle 14 houses miscellaneous components required for converting wind energy into electrical energy, along with various other components needed to operate, control, and optimise the performance of the wind turbine 10. It should be noted that the wind turbine 10 of FIG. 1 is referred to by way of example only, and that it would be possible to implement embodiments of the invention into many different types of wind turbines and their associated systems.

Figure 2:
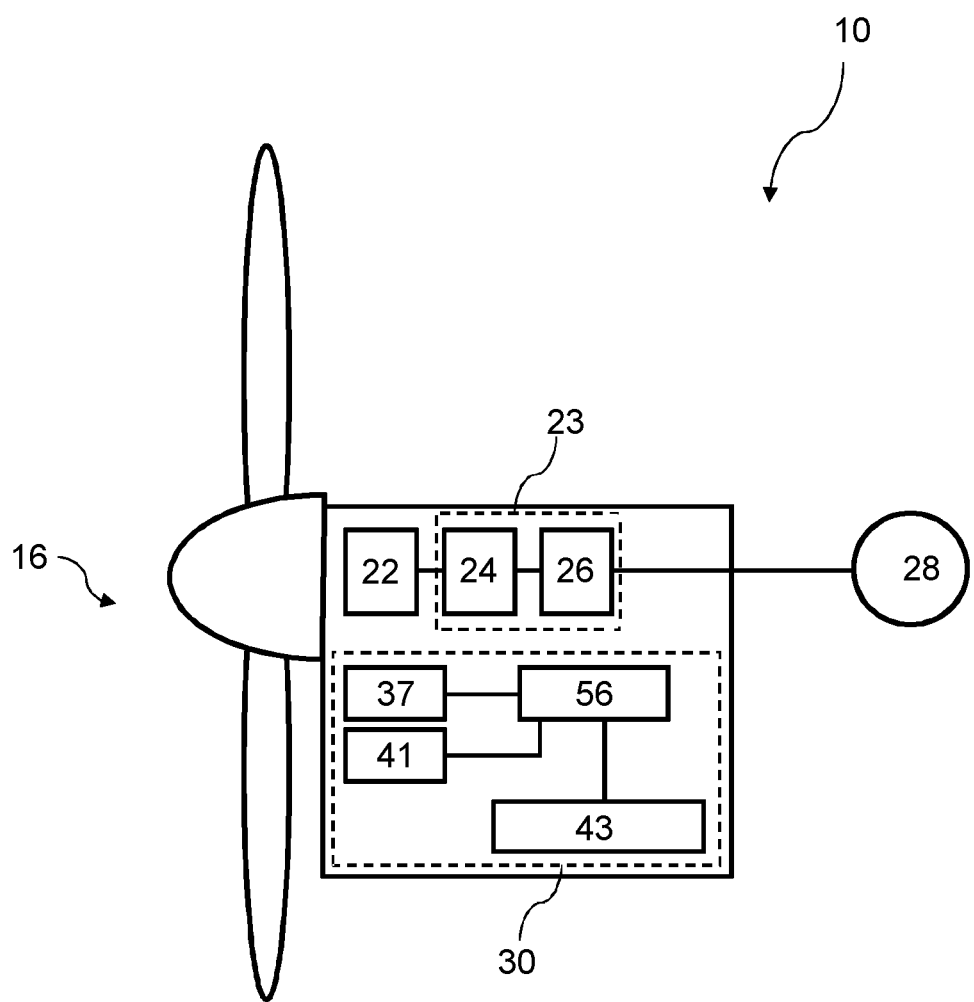
FIG. 2 is a schematic systems view of the wind turbine of FIG. 1.

With reference to FIG. 2, which shows a schematic illustration of the wind turbine 10 at a systems level, the wind turbine 10 further comprises a gearbox 22 and a power generation system 23, comprising the generator 24 and a power converter system 26. The gearbox 22 gears up the rotational speed of the rotor 16 and drives the generator 24, which in turn feeds generated power to the power converter system 26. In the illustrated embodiment, the wind turbine 10 is operatively connected to a load, such as an electrical grid 28, such that the power output of the power converter system 26 can be transmitted to the electrical grid 28. The skilled reader would be aware that a suite of different power transmission options exist.

The wind turbine 10 further comprises a control means 30 that is operable to monitor the operation of the wind turbine 10 and to issue commands thereto to achieve a set of control objectives. The control means 30 comprises a processing module 56 configured to execute instructions that are stored in and read from a memory module 37 and/or an external data store (not shown). Measurement data may also be stored in the memory module 37 and recalled in order to execute processes according to the instructions being carried out by the processing module 56. The control means 30 may also comprise a plurality of sensors 41 disposed within the wind turbine 10, together with a plurality of control units 43 in communication with the processing module 56, for controlling the wind turbine 10 and performing a suite of safety and diagnostic monitoring functions, and carrying out corrective action if necessary.

Figure 3:
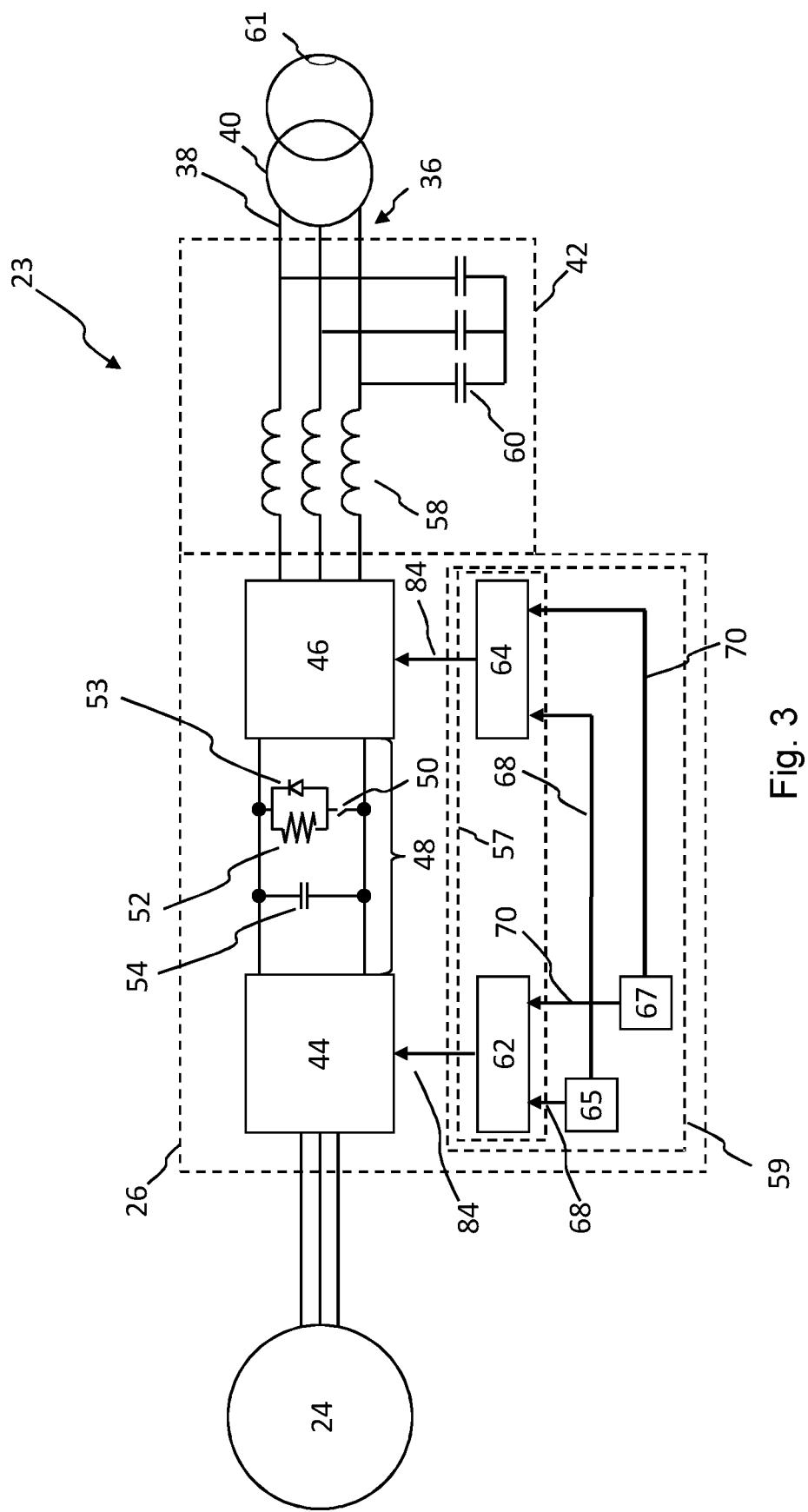
FIG. 3 is a schematic systems view of a power generation system for use in the wind turbine of FIG. 1.

FIG. 3 is a more detailed schematic overview of the power generation system 23 to which methods according to embodiments of the invention may be applied. The components of the power generation system 23 are conventional and, as such, familiar to the skilled reader, and so will only be described in overview. Moreover, it should be noted that the example of the power generation system 23 shown in FIG. 3 is representative only, and the skilled reader will appreciate that the methods described below may be applicable to many different configurations of power generation systems. For example, although the power generation system 23 shown in FIG. 3 is based on a full-scale converter architecture, in practice the invention may be used with other types of converters, and in general terms the invention is suitable for use with all topologies, such as DFIG arrangements.

As already noted, the power generation system 23 comprises the generator 24, driven by the rotor 16 (not shown in FIG. 3) to produce electrical power, along with a low voltage link 36 defined by a bundle of conductor lines 38 terminating at a coupling transformer 40. The coupling transformer 40 acts as a terminal that connects the power generation system 23 to a grid transmission or distribution line (not shown) that, in turn, connects to the electrical grid 28. Thus, electrical power produced by the power generation system 23 is delivered to the electrical grid 28 through the coupling transformer 40.

As already noted, the power generation system 23 also includes the power converter system 26, together with a filter 42, disposed between the generator 24 and the coupling transformer 40, to process the output of the generator 24 into a suitable waveform having the same frequency as the electrical grid 28 and the appropriate phase angle.

The filter 42, which in this example comprises a respective inductor 58 with a respective shunted filter capacitor 60 for each of the conductor lines 38, provides low-pass filtering for removing switching harmonics from the AC waveform. The conductor lines 38 may also each include a respective circuit breaker (not shown) for managing faults within the power generation system 23.

As noted above, the low voltage link 36 terminates at the coupling transformer 40, which provides a required step-up in voltage. A high voltage output from the coupling transformer 40 defines a terminal 61, which acts to couple the power generation system 23 to the grid transmission or distribution line.

The power converter system 26 provides AC to AC conversion by feeding electrical current through a generator side converter 44 followed by a line side converter 46 in series for converting AC to DC and DC to AC respectively. The generator side converter 44 is connected to the line side converter 46 by a DC link 48. The DC link 48 comprises a plurality of switches, generally designated by 50, in series with respective resistors 52 and diodes 53 in a parallel arrangement, to act as a dump load to enable excess energy to be discharged, and a capacitor 54 providing smoothing for the DC output of the generator side converter 44. The smoothed DC output of the generator side converter 44 is received as a DC input by the line side converter 46, which creates a three-phase AC output. The AC output leaves the power converter system 26 through the conductor lines 38, one carrying each phase, and is delivered to the coupling transformer 40.

Any suitable power converter system 26 may be used. In this embodiment, the generator side converter 44 and the line side converter 46 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using modulated drive signals, which are based on voltage reference vectors issued from respective current controllers, which form part of controller blocks 62, 64. The generator side current controller block 62 and the line side current controller block 64 define part of a power converter controller 57, which in turn forms part of an overlaying power converter control system 59. The current controller blocks 62, 64 each may include an internal memory module and a processing module (not shown) configured to execute instructions that are stored in and read from the internal memory module for controlling the power converter system 26 according to a power conversion control strategy. Alternatively, the instructions executed by the processing module may be received from an external data store.

The power converter control system 59 forms part of a closed loop feedback control path and includes a suite of control modules, including active and reactive power control modules 65, 67 that interface with the current controller blocks 62, 64, and is operable to diagnose and control the performance of the power converter system 26. To this end, the power converter system 26 acts based on sample data obtained by a sampling system (not shown) that probes the power generation system 23 at various stages to sample electrical signals that are indicative of current and/or voltage, for example. In particular, as is typical for a full-scale architecture, the sampling system may gather raw data relating to the current and voltage of the outputs from the generator 24 and the power converter system 26, for example, together with the load on the electrical grid 28. This raw data is processed into sample data, which is then passed to the power converter control system 59 to be used to determine operating parameters for the power generation system 23. Some of the sample data is used by the active and reactive power control modules 65, 67 to determine active and reactive current reference vector signals 68, 70 based on the active and reactive components of the AC output. The current references vector signals 68, 70 are then sent to and processed by the current controller blocks 62, 64, which, as noted above, are operable to determine and issue corresponding voltage reference vector signals 84, forming the basis of the modulated drive signals for the switching devices.

The output voltage of the line side converter 46 is limited by the available DC link voltage, and the ability of the line side converter 46 to output a given voltage, in view of the DC link voltage, is measured by a modulation index $m_i$, which characterises the operation of the line side converter 46 as being in either a linear modulation region or a non-linear, overmodulation region. In the linear modulation region, the line side converter 46 can only output 90.6% of the maximum possible output voltage. If overmodulation is used, for example as a result of an overvoltage event in the electrical grid 28, the output voltage of the line side converter 46 can be increased beyond 90.6% up to the maximum possible output voltage, in which case the line side converter 46 is said to operate in six-step operation.

A problem with operating the line side converter 46 in the overmodulation region is it leads to a loss of control of the current controller blocks 62, 64 as the current control modules associated with the control controller blocks 62, 64 become saturated. One way of compensating for this loss of control is to linearize a modulator of the line side converter 46, ensuring that the input and output modulation index to the modulator and from the line side converter 46 respectively are substantially equal. But this is not suitable for closed loop feedback control systems.

Figure 4:
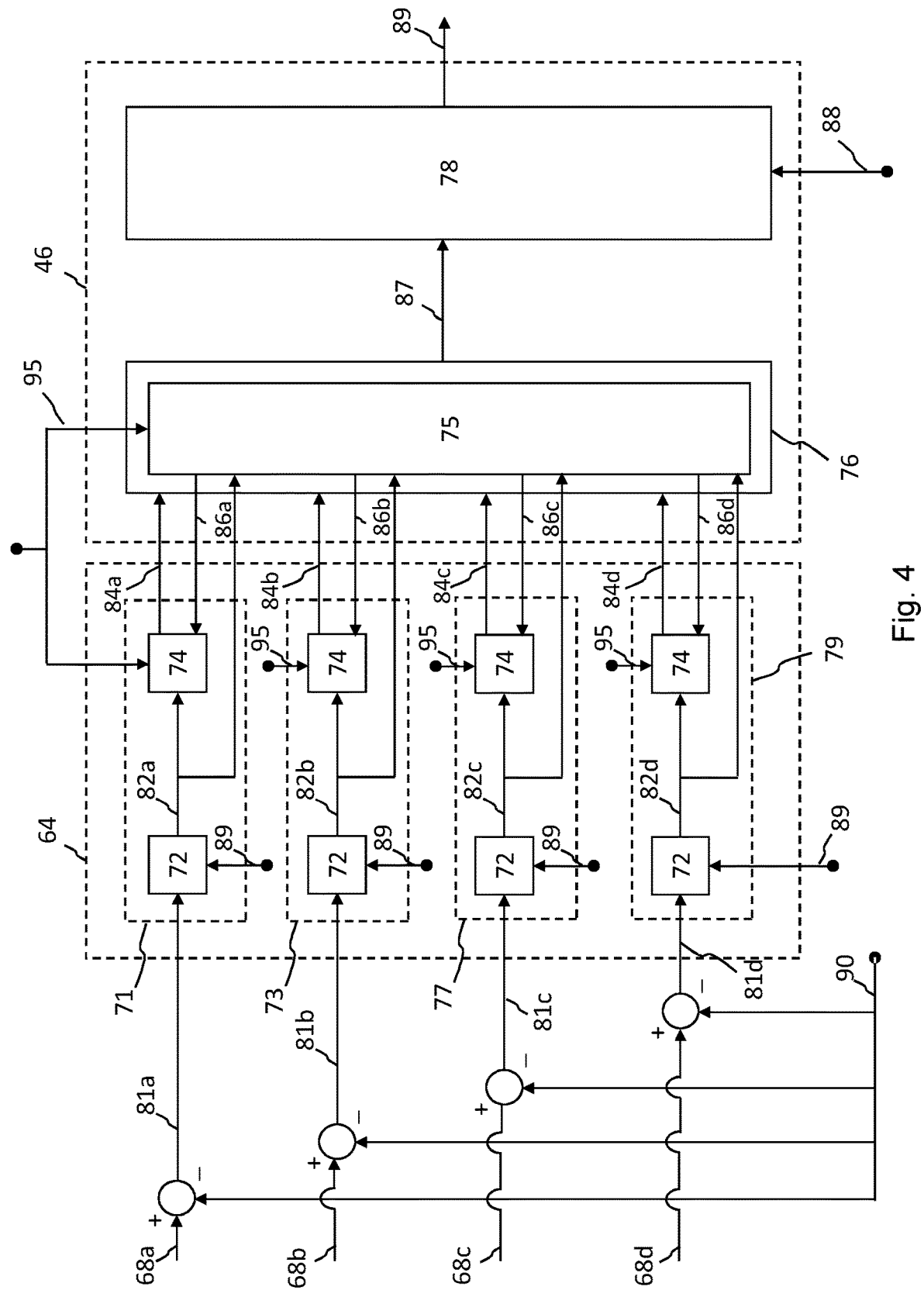
FIG. 4 is a schematic component view of a line side converter and an associated current controller block of the power generation system of FIG. 3.

FIG. 4 provides a schematic overview of the primary components of the line side converter 46, together with the line side current controller block 64 to which methods according to the invention may be applied. The line side current controller block 64 comprises four current controllers 71, 73, 77, 79 configured to process respective current reference vector signals 68a, 68b, 68c, 68d, each relating to one of a positive or negative sequence in a d-q two-axis rotational reference frame (QPos, QNeg, DPos, DNeg).

Each current controller 71, 73, 77, 79 comprises a conventional current control module 72 and the overmodulation current control module 74, which is suitably configured to implement methods according to the invention. The current controllers 71, 73, 77, 79 are operatively coupled, via their respective overmodulation current control module 74, to the line side converter 46, which comprise a modulator 76 and a power converter 78. At a general level, the overmodulation current control modules 74 are operable to maintain the performance of their respective current control module 72 when the line side converter 46 is operating in the overmodulation region by ensuring that a voltage, indicated by a voltage reference vectors 84a, 84b, 84c, 84d, outputted by the current controllers 71, 73, 77, 79 substantially equal an output voltage 89 of the line side converter 46.

Figure 5:
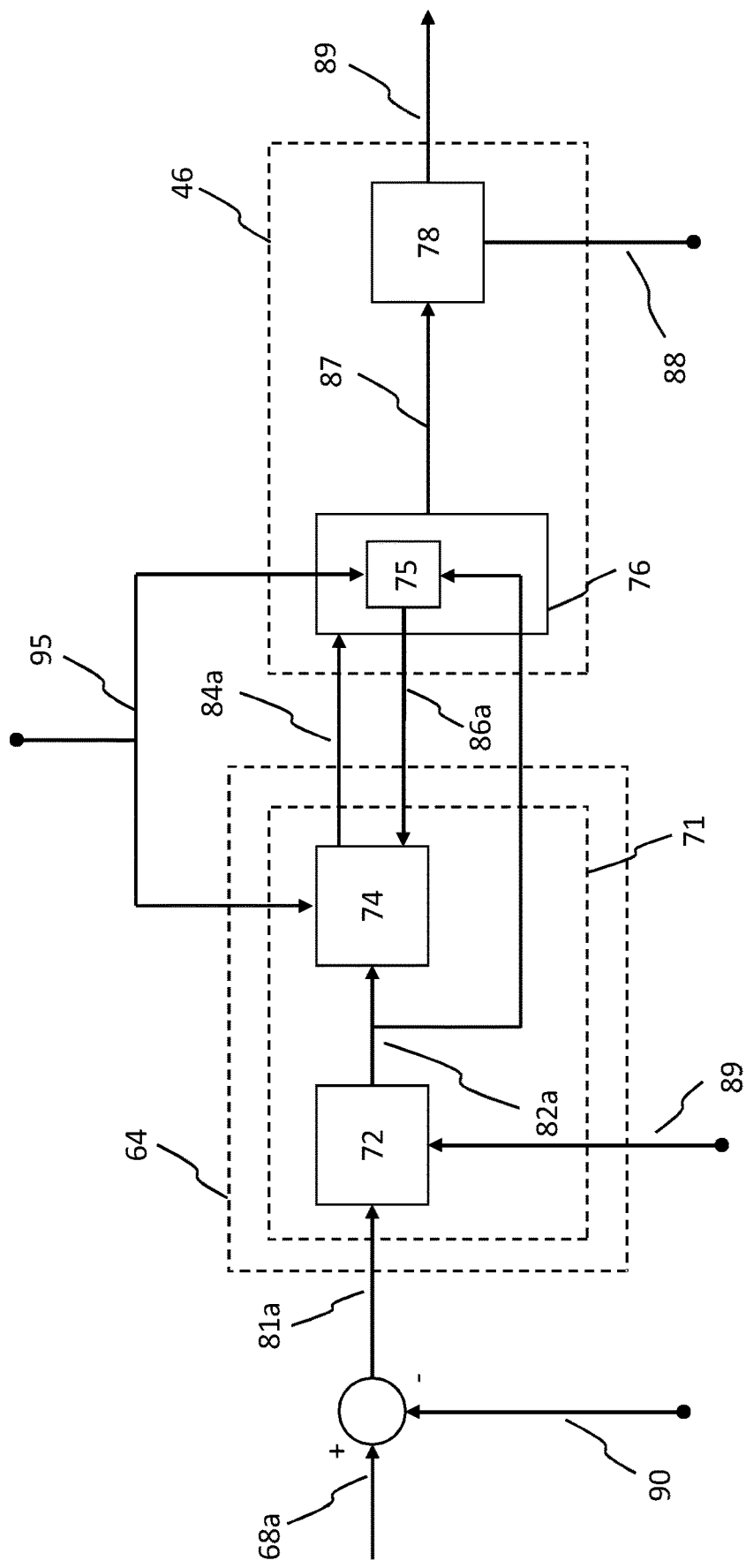
FIG. 5 is a schematic component view of the line side converter and current controller block of FIG. 4 showing only a single current controller within the control controller block.

To this end, and with reference to FIG. 5, which, for the sake of simplicity, only shows one current controller 71 of the four current controllers 71, 73, 77, 79 in the line side current controller block 64, the current control module 72 is configured to receive a signal indicative of a modified current reference vector 81a, which is based on a current reference error. In this embodiment, the current reference error relates to a difference between signals indicative of the current reference vector 68a and a measured current reference 90, which is fed back via a closed loop feedback control path 88, only part of which is shown. On receiving the modified current reference vector signal 81a, the current control module 72 is configured to determine and output a signal indicative of a voltage reference vector 82a, based on the modified current reference vector signal 81a and a signal indicative of the output voltage 89 received via the closed loop feedback control path 88. The voltage reference vector signal 82a is fed forward to the modulator 76, which is operable to determine a gain $G_x$ as described below in more detail, and is also sent to the overmodulation current control module 74. The overmodulation current control module 74 is configured to determine and output a signal indicative of a compensated voltage reference vector 84a, which is based on a fundamental frequency of the voltage reference vector signal 82a. That is, the periodic waveform of the compensated voltage reference vector signal 84a has a frequency the same as or substantially similar to the fundamental frequency of the voltage reference vector signal 82a. The compensated voltage reference vector signal 84a, together with the other compensated voltage reference vector signals 84b, 84c, 84d issued by the remaining current controllers 73, 77, 79, is then sent to and processed by the modulator 76, which is configured to determine and output a modulated drive signal 87 for the converter 78 based on a combination of the compensated voltage reference vector signals 84a, 84b, 84c, 84d. That is, the compensated voltage reference vector signals 84a, 84b, 84c, 84d are mapped to a single output, the modulated drive signal 87, using a cross-coupling mapping function. Alternatively, although not shown in the figures, the compensated voltage reference vector signals 84a, 84b, 84c, 84d could also be mapped to four respective modulated drive signals using a dependent mapping function. It should be noted, with reference to FIG. 4, that each of the remaining current controllers 73, 77, 79 in the line side current controller block 64 are operable to output their respective compensated voltage reference vector signal 84b, 84c, 84d in the way described above in respect of the current controller 71 of FIG. 5.

Figure 6:
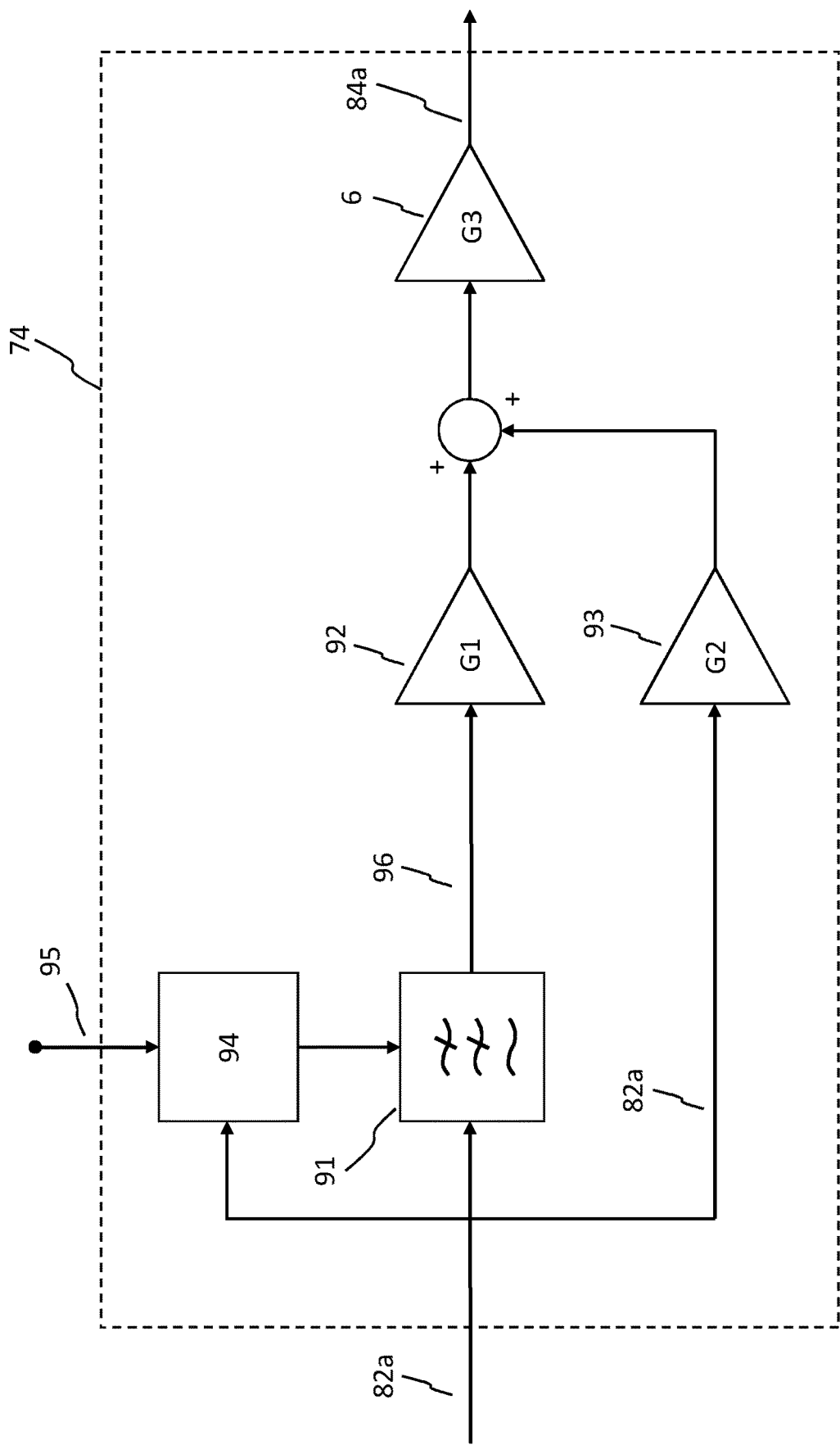
FIG. 6 is schematic component view of an overmodulation current control module of the current controller of FIG. 5; and, FIG. 7 is a schematic component view of a gain mapping controller of the line side converter of FIG. 5.

FIG. 6 provides a schematic component overview of the overmodulation current control module 74 present in the first current controller 71. It should be noted that the overmodulation current control modules 74 in the other current controllers 73, 77, 79 are equivalent to the one shown in FIG. 6. As noted above, the overmodulation current control module 74 is configured to determine and output the compensated voltage reference vector signal 84*a*, which is indicative of the fundamental frequency of the voltage reference vector signal 82*a*. To this end, the overmodulation current control module 74 comprising two parallel branches. One branch comprises a filter 91 and a first gain 92 arranged in series, and a second branch comprises a second gain 93. The filter 91 is operable to remove high frequency content from the voltage reference vector signal 82*a* received from the current controller module 72 to provide a signal indicative of a modified voltage reference vector 96. The first gain 92 is operable to negatively gain adjust the modified voltage reference vector signal 96 using a reducing first gain G=calculated as:

$$G_1 = \frac{G_x - 1}{G_x}$$

Conversely, the second gain 93 is operable to positively gain adjust the voltage reference vector signal 82*a* using an amplifying second gain $G_2$ calculated as:

$$G_2 = \frac{1}{G_x}$$

The gain adjusted modified voltage reference vector signal 96 and the gain adjusted voltage reference vector signal 82*a* are then combined to provide the compensated voltage reference vector signal 84*a*. The compensated voltage reference vector signal 84*a* might optionally be processed by a third gain 6, which is operable to amplify the compensated voltage reference vector signal 84*a* signal by a third gain $C_3$. which equals the gain $G_x$, to produce a gain adjusted compensated voltage reference vector signal 84*a*.

Turning back to FIG. 5, as noted above, the modulator 76 is operable to determine the gain $G_x$. To this end, the modulator 76 comprises a gain mapping controller 75, which operable to issue a signal 86*a* indicative of the gain $G_x$ from modulator 76 to the overmodulation current control module 74 for determining the first, second and third gains $G_1$, $G_2$, $G_3$. The gain $G_x$ is determined as a predetermined function of the modulation index $m_i$, and represents the gain needed to ensure that the voltage indicated by the compensated voltage reference vector signal 84*a* substantially equals the output voltage 89 of the line side converter 46.

Figure 7:
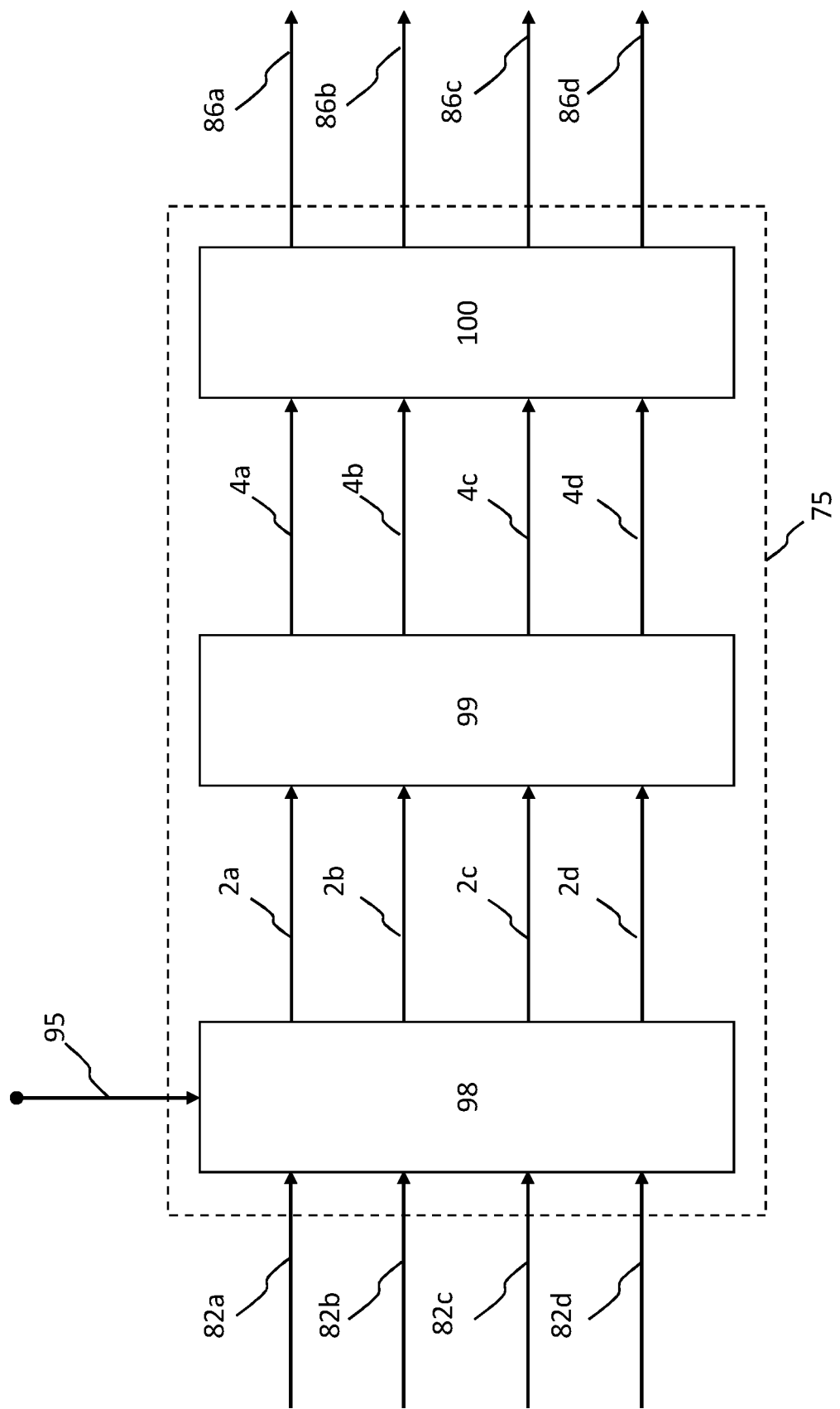

With reference to FIG. 7, the gain mapping controller 75 comprises a modulation index module 98, an averaging module 99 and a gain mapping control module 100. The modulation index module 98 is configured to receive the voltage reference vector signals 82*a*, 82*b*, 82*c*, 82*d* and a signal indicative of a DC link voltage 95, which is provided through the closed loop feedback control path 88, and determine the modulation index $m_i$ according to the equation below:

$$m_i = \frac{V_r}{\left(\frac{2}{\pi}\right)V_{dc}}$$

where $V_r$ is the voltage reference vector signal 82*a*, 82*b*, 82*c*, 82*d* and $V_{dc}$ is the DC link voltage signal 95.

It will be appreciated by the skilled reader that this equation is only one example of how the modulation index $m_i$ might be calculated, and that other options for calculating the modulation index $m_i$ exist.

The modulation index module 98 is then operable to issue respective signals 2*a*, 2*b*, 2*c*, 2*d* indicative of the modulation indexes $m_i$ which are processed by the averaging module 99 in order to determine moving-average modulation indices $m_i$ over a predetermined time period. Signals 4*a*, 4*b*, 4*c*, 4*d* indicative of the respective moving-average modulation indices $m_i$ are then sent by the averaging module 99 to be processed by the gain mapping control module 100 that is operable to determine the gains $G_x$ ($G_{xQPos}$, $G_{xQNeg}$, $G_{xDPos}$, $G_{xDNeg}$) as a function of the moving-averaging modulation indexes $m_i$ ($m_{iQPos}$, $m_{iQNeg}$, $m_{iDPos}$, $m_{iDNeg}$) according a mapping function, which may be derivable from a 4-dimensional lookup table or a neural network. The mapping control module 100 then issues respective signals 86*a*, 86*b*, 86*c*, 86*d* indicative of the gains $G_x$ ($G_{xQPos}$, $G_{xQNeg}$, $G_{xDPos}$, $G_{xDNeg}$) from the modulator 76 to the overmodulation current control module 74 for determining the first, second and third gains $G_1$($G_{1QPos}$, $G_{1QNeg}$, $G_{1DPos}$, $G_{1DNeg}$), $G_2$($G_{2QPos}$, $G_{2QNeg}$, $G_{2DPos}$, $G_{1DNeg}$), $G_3$($G_{3QPos}$, $G_{3QNeg}$, $G_{3DPos}$, $G_{3DNeg}$).

As noted above, the line side controller block 64 may comprise a plurality of current controllers, each comprising a respective overmodulation current control module. In this instance, the same gains $G_x$ may be used to determine the first, second and third gains $G_1$, $G_2$, $G_3$ for each overmodulation current control module. Alternatively, individual gains $G_x$ may be used for respective overmodulation current control modules, where each individual gain $G_x$ is determined according to the process described above.

Turning back to FIG. 6, the filter 91 of the overmodulation current control module 74 may be a variable bandwidth low-pass filter, the bandwidth of which is scheduled according to a mapping function provided by a bandwidth mapping control module 94. Similar to the process by which the gains $G_x$ are determined, the bandwidth mapping control module 94 is operable also to determine the bandwidth of the filter 91 according to the modulation indexes $m_i$ or a derivative of the moving-average modulation indexes $m_i$, both of which are determined based on the voltage reference vector signal 82*a* and the DC link voltage signal 95, which again is provided through the closed loop feedback control path 88.

Although the invention has been described with reference to the line side converter 46 and the respective current controller block 64, it will be apparent to the skilled reader that the processes and methods described herein could also be applied to the generator side converter 44 and its respective current controller block 62.

It will be appreciated by those skilled in the art that the invention has been described by way of example only, and that a variety of alternative approaches may be adopted without departing from the scope of the invention as defined by the appended claims. For example, the respective mapping functions of the gain mapping control module 100 and the bandwidth mapping control module 94 may be based on a look-up table stored in the internal memory module or accessible from the external data store, or alternatively may be carried out on an artificial neural network.

The invention claimed is:

1. A method of controlling a power converter system operating in an overmodulation region, the power converter system comprising more than two current controllers, a modulator and a power converter, wherein the modulator is configured to provide at least one modulated drive signal to the power converter based on voltage reference vector signals from the more than two current controllers, the method comprising:
  determining the voltage reference vector signals, wherein, for each one of the voltage reference vector signals:
    applying a filter for each of the voltage reference vector signals to provide modified voltage reference vector signals;
    applying a first set of adjustment gains (G1) to the modified voltage reference vector signals; and
    applying a second set of adjustment gains (G2) to the voltage reference vector signals;
  determining, in the more than two current controllers, compensated voltage reference vector signals indicative of a fundamental frequency of a respective voltage reference vector signal, wherein the compensated voltage reference vector signals are determined by combining the gain adjusted modified voltage reference vector signals and the gain adjusted voltage reference vector signals; and,
  determining the at least one modulated drive signal based on a combination of the compensated voltage reference vector signals.

2. The method of claim 1, wherein the first set of adjustment gains ($G_1$) is a reducing set of adjustment gains and the second set of adjustment gains ($G_2$) is an amplifying set of adjustment gains.

3. The method of claim 1, further comprising, for each one of the compensated voltage reference vector signals:
  applying a third set of adjustment gains ($G_3$) to the compensated voltage reference vector signals; and,
  determining the modulated drive signal based on a combination of the gain adjusted compensated voltage reference vector signals.

4. The method of claim 3, further comprising:
  determining a set of gains ($G_x$) as a predetermined function of a set of modulation indexes ($m_i$); and,
  determining the set of adjustment gains ($G_1$, $G_2$, $G_3$) based on the set of gains ($G_x$).

5. The method of claim 1, wherein the voltage reference vector signals are determined based on current reference errors.

6. The method of claim 5, wherein the current reference errors are determined based on the difference between a respective current reference vector signal and a measured current reference from the power converter.

7. The method of claim 6, wherein current reference vector signal relates to one of a positive or negative sequence in a d-q two-axis rotational reference frame.

8. The method of claim 1, wherein the filter for each of the voltage reference vector signals is a low-pass filter comprising a variable bandwidth.

9. The method of claim 8, wherein the variable bandwidth of the low-pass filters is based on a set of modulation indexes ($m_i$).

10. The method of claim 9, wherein the modulation indexes ($m_i$) are determined based on a DC link voltage signal and the respective voltage reference vector signals.

11. The method of claim 10, wherein the modulation indexes ($m_i$) are a moving-average modulation indexes.

12. The method of claim 1, wherein the more than two current controllers comprise four current controllers.

13. A plurality of current controllers for a power converter system comprising a processor and a memory module, wherein the memory module comprises a set of program code instructions which when executed by the processor configure the processor to perform an operation of controlling the power converter system operating in an overmodulation region, the power converter system comprising a modulator and a power converter, wherein the modulator is configured to provide at least one modulated drive signal to the power converter based on voltage reference vector signals from the plurality of current controllers; the operation, comprising:
  determining the voltage reference vector signals, wherein, for each one of the voltage reference vector signals:
    applying a filter for each of the voltage reference vector signals to provide modified voltage reference vector signals;
    applying a first set of adjustment gains (G1) to the modified voltage reference vector signals; and
    applying a second set of adjustment gains (G2) to the voltage reference vector signals;
  determining, in the plurality of current controllers, compensated voltage reference vector signals indicative of a fundamental frequency of a respective voltage reference vector signal, wherein the compensated voltage reference vector signals are determined by combining the gain adjusted modified voltage reference vector signals and the gain adjusted voltage reference vector signals; and
  determining the at least one modulated drive signal based on a combination of the compensated voltage reference vector signals.

14. The plurality of current controllers of claim 13, wherein the first set of adjustment gains ($G_1$) is a reducing set of adjustments gains and the second set of adjustment gains ($G_2$) is an amplifying set of adjustments gains.

15. A power generation system, comprising:
  a plurality of current controllers, each current controller comprising:
    a processor; and
    a memory module, wherein the memory module comprises a set of program code instructions which when executed by the processor configure the processor to perform an operation of controlling a power converter system operating in an overmodulation region, the power converter system comprising a modulator and a power converter, wherein the modulator is configured to provide at least one modulated drive signal to the power converter based on voltage reference vector signals from the plurality of current controller; the operation, comprising:
      determining the voltage reference vector signals, wherein, for each one of the voltage reference vector signals:
        applying a filter for each of the voltage reference vector signals to provide modified voltage reference vector signals;
        applying a first set of adjustment gains (G1) to the modified voltage reference vector signals; and
        applying a second set of adjustment gains (G2) to the voltage reference vector signals;
      determining, in the plurality of current controllers, compensated voltage reference vector signals indicative of a fundamental frequency of a respective voltage reference vector signal, wherein the compensated voltage reference vector signals are determined by combining the gain adjusted modified voltage reference vector signals and the gain adjusted voltage reference vector signals; and, determining the at least one modulated drive signal based on a combination of the compensated voltage reference vector signals.

16. The power generation system of claim 15, wherein the first set of adjustment gains ($G_1$) is a reducing set of adjustments gains and the second set of adjustment gains ($G_2$) is an amplifying set of adjustments gains.

\* \* \* \* \*